United States Patent [19]

Komatsu et al.

[11] Patent Number: 5,152,267
[45] Date of Patent: Oct. 6, 1992

[54] VARIABLE CAM ENGINE

[75] Inventors: Hiroshi Komatsu; Makoto Nakamura; Kunifumi Sawamoto; Hiroyuki Itoyama, all of Yokohama, Japan

[73] Assignee: Nissan Motor Co., Ltd., Yokohama, Japan

[21] Appl. No.: 785,339

[22] Filed: Nov. 1, 1991

[30] Foreign Application Priority Data

Nov. 2, 1990 [JP] Japan .................. 2-297780

[51] Int. Cl.5 .............. F02D 9/00; F01L 1/34
[52] U.S. Cl. ............................. 123/399; 123/90.16
[58] Field of Search .......... 123/90.15, 90.16, 399, 123/361

[56] References Cited

U.S. PATENT DOCUMENTS

| 4,581,924 | 4/1986 | Otobe et al. | 123/399 |
| 4,887,561 | 12/1989 | Kishi | 123/90.16 |
| 4,899,701 | 2/1990 | Inoue et al. | 123/90.16 |
| 4,926,823 | 5/1990 | Kishi et al. | 123/90.16 |

FOREIGN PATENT DOCUMENTS 63-167016 7/1988 Japan .

Primary Examiner—E. Rollins Cross
Assistant Examiner—Weilun Lo
Attorney, Agent, or Firm—Foley & Lardner

[57] ABSTRACT

A variable cam engine with a valve driven by cams which rotate in synchronism with the engine revolution comprises a power cam which provide large torque, an economy cam which provides good fuel cost performance, a setting device to set a cam change-over region according to an engine running condition, and a cam change-over mechanism which changes over from one cam to another at the set change-over regions and transmits the motion of the cam selected by the change-over to the valve. It further comprises a device to correct the throttle opening such that the torque generated before and after making a cam change-over is the same. It may further comprise a device to retard the engine ignition period at the same time as the throttle opening is corrected when the cam change-over is made. This arrangement prevents the occurrence of a torque step when a change-over is made from the power cam to the economy cam and vice versa, and prevents shock or impairment of exhaust gas composition due to the cam change-over.

5 Claims, 8 Drawing Sheets

VARIABLE CAM ENGINE

FIELD OF THE INVENTION

This invention relates to an engine wherein the characteristics of the cams driving the air intake and exhaust valves can be selected according to the running condition of the engine, and more particularly, to a control system for controlling the engine power when a cam change-over is made.

BACKGROUND OF THE INVENTION

It is known that the optimum characteritics of the air intake and exhaust valves of an engine differ according to the running conditions of the engine. At high speed, for example, a large valve lift and a long valve opening period are required in order to obtain large torque, while at low speed, a comparatively small valve lift and short opening period are required.

Further, if fuel consumption is more important than power such as when the engine is on partial load, for example, an even smaller valve lift and shorter valve opening period are required. To improve fuel performance, the negative intake pressure and pumping loss have to be reduced, and it is therefore necessary to reduce the valve lift and reduce the valve opening period so as to increase the throttle opening for the same torque. Due to these differences, the running conditions of engines such as car engines vary widely, and it was therefore difficult to design the shape of valve drive cams in order to obtain optimum performance for all running conditions.

In Tokkai Sho 63-167016 (Koho) published by the Japanese Patent Office, a variable cam engine is proposed wherein several cams with different shapes are provided, and the optimum valve timing is obtained by selecting these cams depending on the engine running conditions.

In such a variable cam engine, in order that the engine output torque does not vary discontinuously, the change-over between cams is made at a certain engine speed chosen such that the output torques of the cams are the same for the same throttle opening.

However, although there does exist an optimum speed for making a change-over between a low speed power cam which gives large torque at low speed and a high speed power cam which gives a large torque at high speed, no such speed exists for making a change-over between an economy cam which emphasizes fuel consumption and has a small output torque over the whole range of speeds, and the power cams. The cam change-over is therefore necessarily accompanied by a torque step.

In general, cam change-overs are made in accordance with operation of the accelerator pedal. If for example the accelerator pedal is depressed when the engine is running on the economy cam, an output torque in excess of the range available from the economy cam is required, and a change-over is then made to either the low speed or high speed power cam depending on the engine speed at that time.

However, as the torques generated before and after the cam change-over are very different for the same throttle opening, a torque shock is produced. To correct this, the driver had to operate the accelerator which seriously affected the drive performance of the vehicle.

SUMMARY OF THE INVENTION

It is therefore an object of the invention to absorb the torque step when the power cams are changed over to the economy cam, and vice versa.

To achieve this object, this invention provides a variable cam engine with a valve driven by cams which rotate in synchronism with the engine revolution, comprising a power cam whose shape is designed to give large torque output to the engine, an economy cam whose shape is designed to give good fuel cost performance, setting means to set a change-over region of the cams according to engine running conditions, a cam change-over mechanism which changes over from one to another of the cams at the set change-over region and transmits the motion of the cam selected by the change-over to the valve, a throttle valve whose opening can be controlled independently of the accelerator pedal, control means to open and close the throttle valve such that the output torque of the engine depends on the position of the accelerator pedal, and throttle opening correcting means to correct the throttle opening such that the torque generated before and after making a cam change-over is the same.

This invention also provides a variable cam engine with a valve driven by cams which rotate in synchronism with the engine revolution, a power cam whose shape is designed to give large torque output to the engine, an economy cam whose shape is designed to give good fuel cost performance, setting means to set a change-over region of the cam according to engine running conditions, a cam change-over mechanism which changes over from one to another of the cams at the set change-over region and transmits the motion of the cam selected by the change-over to the valve, a throttle valve whose opening can be controlled independently of the accelerator pedal, control means to open and close the throttle valve such that the output torque of the engine depends on the position of the accelerator pedal, and throttle opening correcting means to correct the throttle opening such that the torque generated before and after making a cam change-over is the same, and ignition period retarding means to temporarily retard an engine ignition period when the cam change-over is made.

DESCRIPTION OF THE PREFERRED EMBODIMENTS

Figure 1:
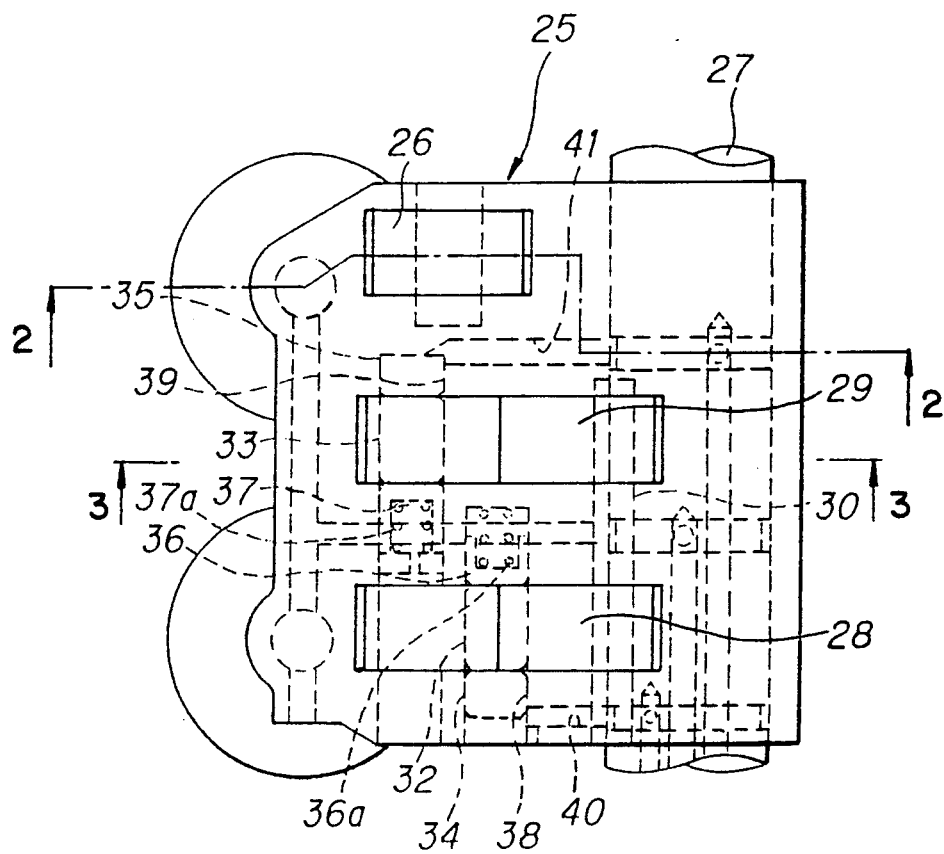
FIG. 1 is a plan view of a cam selecting mechanism of a variable cam engine with a power control mechanism according to this invention.
Figure 2:
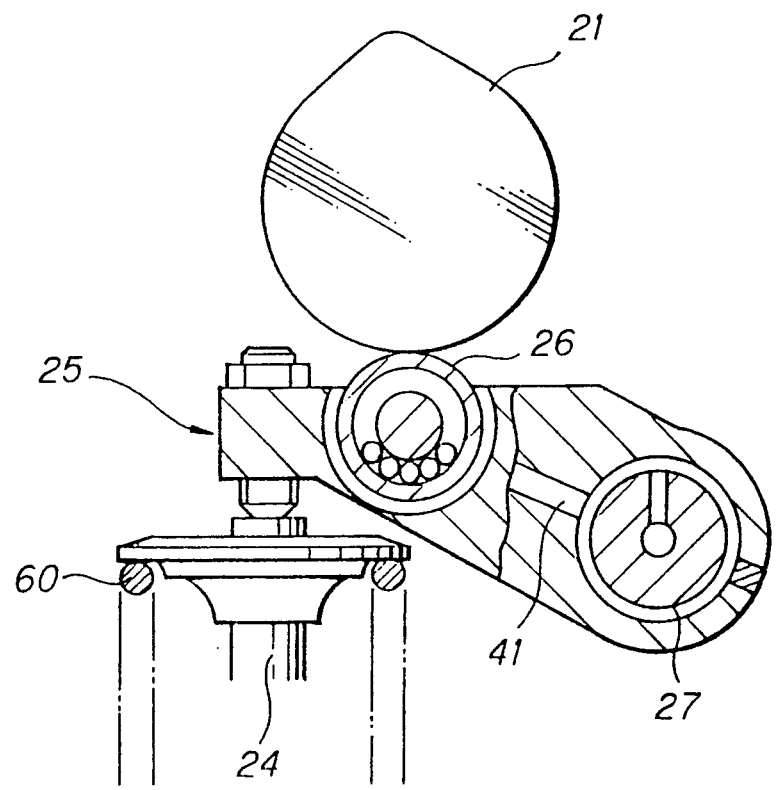
FIG. 2 shows a section through the line 2—2 in FIG. 1.
Figure 3:
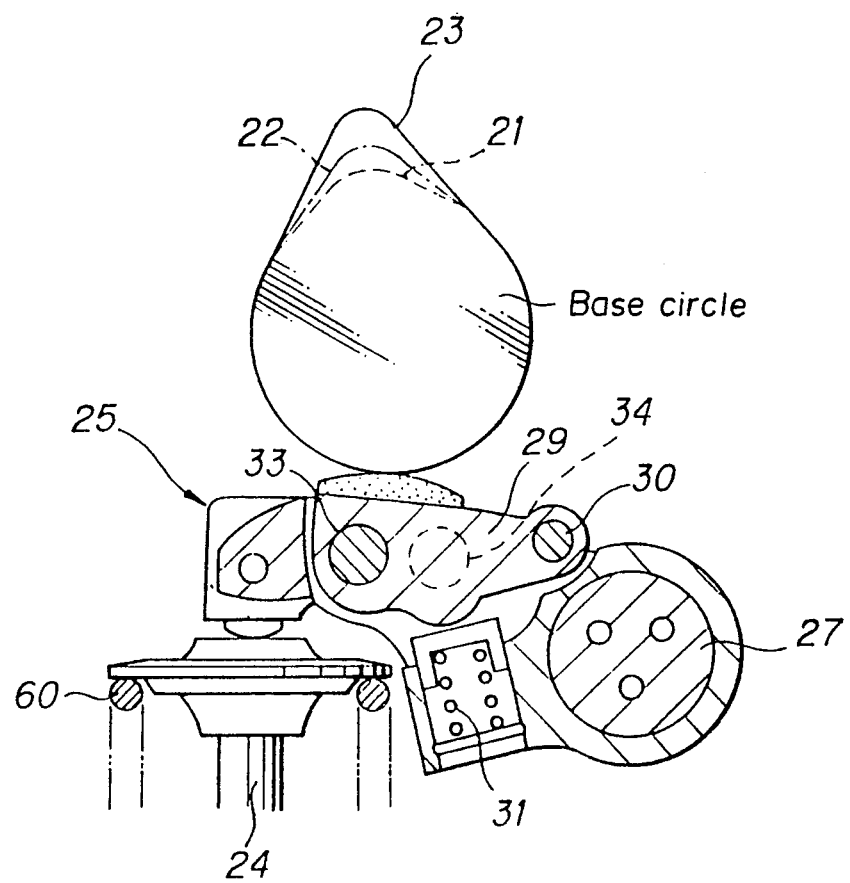
FIG. 3 shows a section through the line 3—3 in FIG. 1.

FIGS. 1, 2 and 3 show the structure of the cam selecting mechanism.

A first cam 21 (economy cam) has a shape which gives both a small cam lift amount and short lift period, and is set such that it gives good fuel cost performance on partial load. A second cam 22 (low speed power cam) has a shape which gives a larger cam lift amount and longer lift period than the first cam 21, and is set such that it generates a large torque at low speeds. A third cam 23 (high speed power cam) has a shape which gives a still higher lift amount and longer lift period than the second cam 22, and is set such that it generates a large torque at high speeds.

Figure 4:
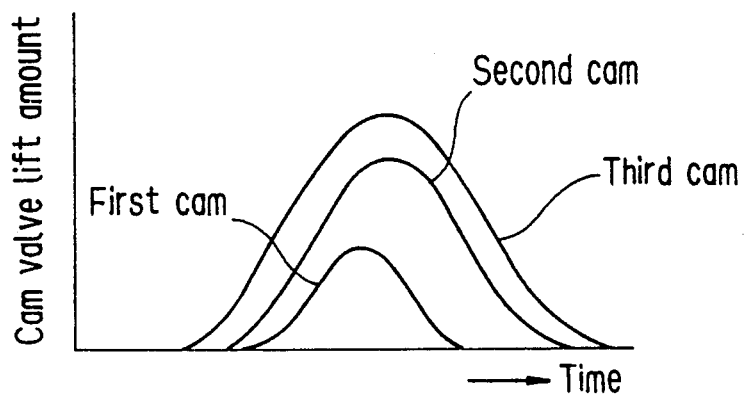
FIG. 4 is a graph showing cam lift characteristics of the variable cam engine with the power control mechanism according to this invention.

The lift characteristics of these cams 21-23 are shown in FIG. 4. The base circle positions of cams 21-23 which are shown in FIG. 3 represent the non-lift intervals of these cams.

These cams 21, 22, 23 are arranged in series on the same cam shaft, not shown, and rotate together in synchronism with the rotation of the motor.

An air intake valve or exhaust valve (referred to hereinafter simply as "a valve") 24 is elastically supported in a closed position by a spring 60, and opened by a main rocker arm 25 which pivots about a rocker arm shaft 27 supported by the engine cylinder head. A roller 26 is attached to the main rocker arm 25 such that it can rotate freely. As shown in FIG. 2, the first cam 21 is in contact with this roller 26 and pushes the main rocker arm 25 down according to its rotation position to open the valve 24 against the force of the spring 60.

Two parallel grooves are formed on one side of the roller 26 in the main rocker arm 25. In these grooves, the two sub-rocker arms 28 and 29 are provided which pivot about a common shaft 30 that is supported by the main rocker arm 25.

The sub-rocker arm 29 is supported such that it is in contact with the third cam 23 by a spring 31 inserted between the sub-rocker arm 29 and the main rocker arm 25 as shown in FIG. 3. Similarly, the sub-rocker arm 28 is supported such that it is in contact with the second cam 22 under the force of another spring. The sub-rocker arms 29 and 28 therefore pivot about the shaft 30 according to the rotation of the cams 23 and 22 respectively.

A cylindrical pin 33 is inserted in a channel running horizontally through the sub-rocker arm 29 such that it is free to slide on the inside of the channel. A hydraulic chamber 39 of the same cross-section as this channel opens onto the inside of the groove in the main rocker arm 25 which accommodates the sub-rocker arm 29, and another pin 35 of the same cross-section as the pin 33 is free to slide on the inner surface of the chamber 39. The pins 33 and and 35 are positioned coaxially in the base circle position of the third cam 23 corresponding to its non-lift position shown in FIG. 3.

A hole of the same cross-section as the aforesaid channel and the hydraulic chamber 39 of the sub-rocker arm 29 is provided in the opposite wall to the hydraulic chamber 39 of the groove housing the sub-rocker arm 29. A plunger 37 is inserted in this hole under the force of a return spring 37a.

When there is no pressurized oil acting on the hydraulic chamber 39, the pins 33 and 35 are pushed by the plunger 37 which is under the force of the return spring 37a so that they are held respectively in the channel of the sub-rocker arm 29 and the hydraulic chamber 39. In this state, the sub-rocker arm 29 can pivot freely with respect to the main rocker arm 25 according to the rotation of the third cam 23.

When pressurized oil is led through a passage 41 into the hydraulic chamber 39 in the base circle position of the third cam 23, the pins 35 and 33 which are positioned coaxially are pushed out by a predetermined distance against the force of the return spring 37a. Part of the pin 35 then enters the channel in the sub-rocker arm 29 and part of the pin 33 enters the hole in the main rocker arm housing the plunger 37 causing the sub-rocker arm 29 to engage with the main rocker arm 25.

Similarly, the sub-rocker arm 28 is caused to engage selectively with the main rocker arm 25 by means of an engaging mechanism which comprises pins 32 and 34, a return spring 36a, a plunger 36, a hydraulic chamber 38 and a passage 40.

When the sub-rocker arm 29 is engaged with the main rocker arm 25, the valve 24 opens and closes according to the motion of the third cam 23.

When the sub-rocker arm 29 is not engaged with the main rocker arm 25 and the sub-rocker arm 28 is engaged with the main rocker arm 25, the valve 24 opens and closes according to the motion of the second cam 22.

When neither of the sub-rocker arms 28 and 29 are engaged with the main rocker arm 25, the valve 24 opens and closes according to the motion of the first cam 21.

In all cases, when the cams 21-23 are in the base circle position as shown in FIGS. 2 and 3, the main rocker arm 25, and the sub-rocker arms 28 and 29 are all in the non-lift position so that the air intake valve 24 is closed. Change-overs between the cams 21-23 are made during this non-lift interval.

Figure 5:
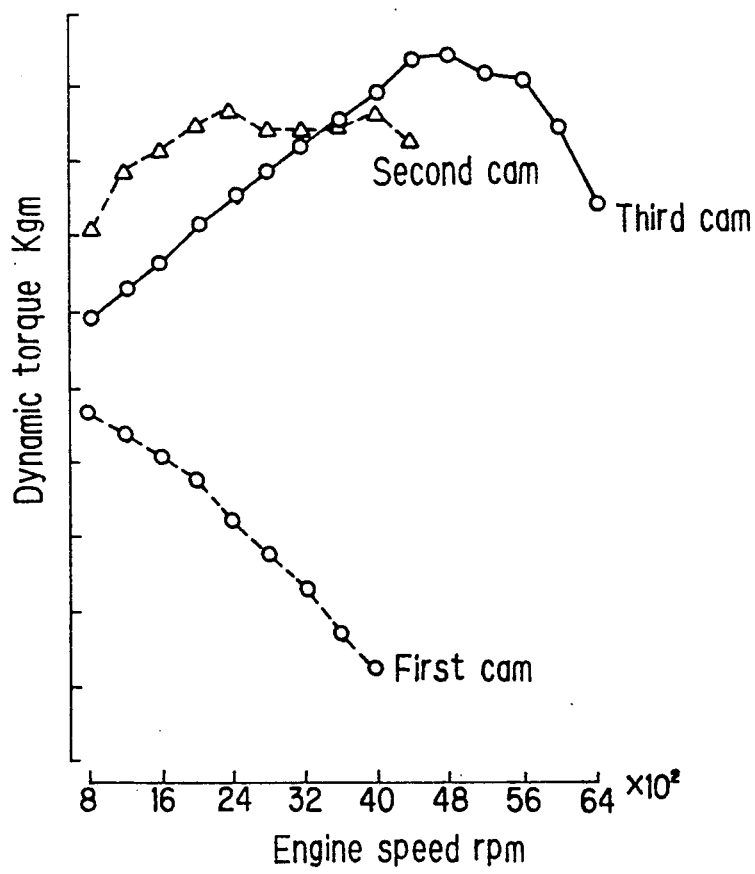
FIG. 5 is a graph showing output characteristics on full throttle of the variable cam engine with the power control mechanism according to this invention.

FIG. 5 shows the torque characteristics of the cams 21-23 at full throttle. The first cam 21 generates a small torque over the whole range of speeds but it gives good fuel cost performance. The second cam 22 generates its maximum torque in the low speed region, while the third cam 23 generates its maximum torque in the high speed region.

Figure 6:
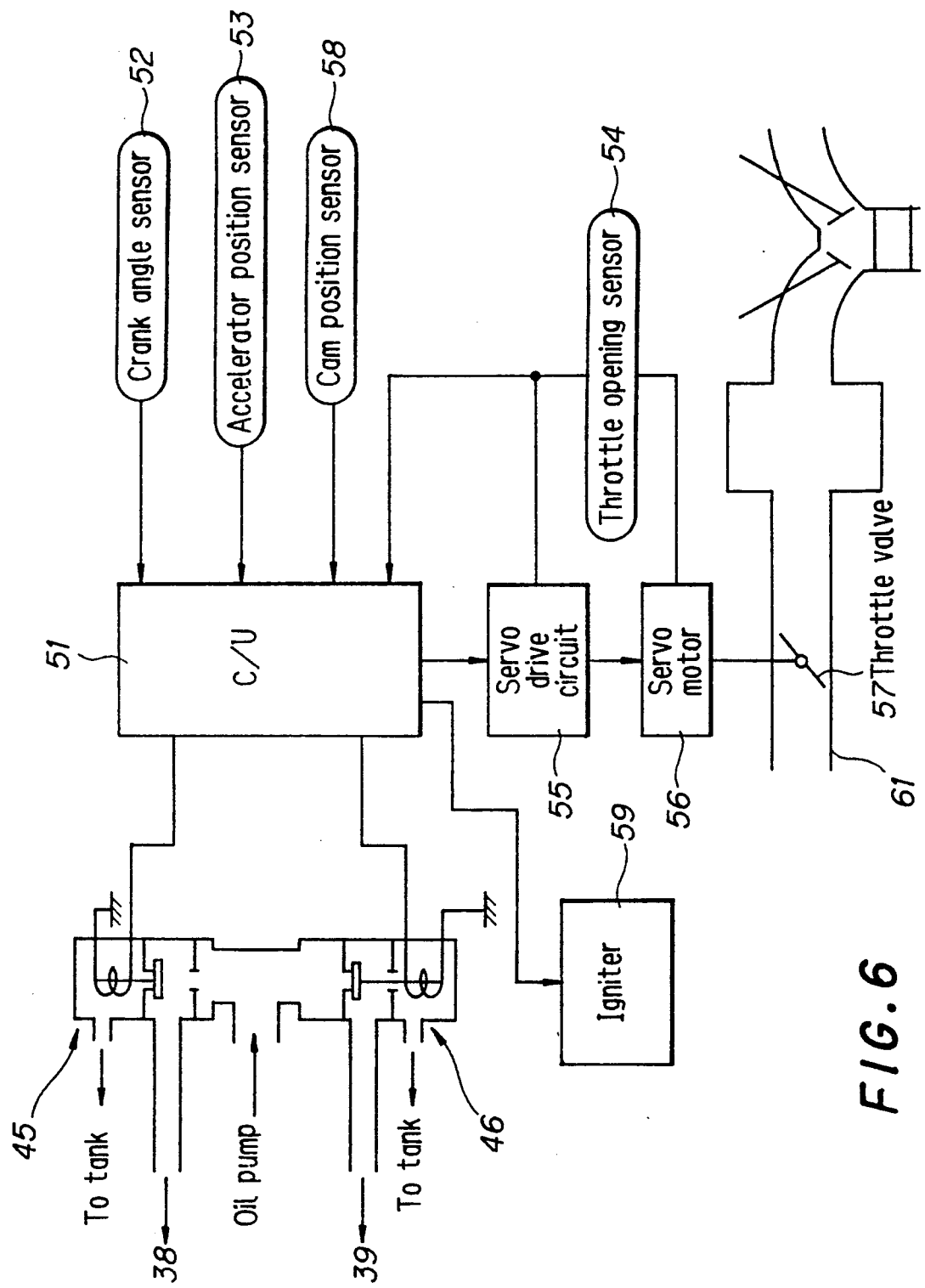
FIG. 6 is a schematic diagram of the power control mechanism according to this invention.

The change-overs between the cams 21, 22 and 23 are performed by a control unit 51 as shown in FIG. 6.

The control unit 51 is provided with a control map shown in FIG. 5 which sets the regions in which change-overs between the cams 21-23 are to be made, and it controls cam change-overs according to the running condition of the engine. The control unit 51 is supplied with signals indicative of engine rotation speed from a crank angle sensor 52 and accelerator depression amount from an accelerator position sensor 53, and a signal from a cam position sensor 58 which detects the cam selected.

Selection of the cams 21-23 by the control unit 51 takes place as follows. If the required torque indicated by the signal from the accelerator position sensor 53 and the engine speed indicated by the signal from the crank angle sensor 52 are in the region of the first cam 21, i.e. the economy cam, this cam 21 is selected.

If the accelerator depression is then increased so that the required torque shifts to the region of the second cam 22, i.e. the low speed power cam, this cam 22 is selected.

If the engine rotation speed then increases from low speed to high speed, the third cam 23, i.e. the high speed power cam, is selected.

Further, if it is judged that a cam change-over is required, a cam change-over signal is output to electromagnetic valves 45 and 46 which supply pressurized oil to the aforesaid two hydraulic chambers 38 and 39, thereby opening or closing the valves 45 and 46 to perform the change-over.

When the electromagnetic valve 45 is opened, pressurized oil is led from the oil pump to the hydraulic chamber 38 so as to cause the sub-rocker arm 28 to engage with the main rocker arm 25. When the electromagnetic valve 46 is opened, pressurized oil is led from the oil pump to the hydraulic chamber 39 so as to cause the sub-rocker arm 29 to engage with the main rocker arm 25. The cams are selected depending on these engaged positions as described hereintofore.

The control unit 51 controls the opening of a throttle valve 57 installed in the intake manifold 61. This throttle valve 57 may be located in the common passage of the intake manifold 61 or in each of the branched passages of the same. The opening of the throttle valve 57 is adjusted independently of the accelerator pedal via a servo motor 56 based on signals output from a servo drive circuit 55. The control unit 51 controls the opening of the throttle valve 57 by means of control signals output to this servo drive circuit 55. At the same time, the actual opening of the throttle valve 57 is fed back to the control unit 51 via a throttle opening sensor 54.

The control unit 51 basically determines the required torque from an input signal supplied by the accelerator position sensor 53, determines the cam currently in use from an input signal supplied by the cam position sensor 58, computes the throttle opening necessary to generate the required torque, and controls the opening of the throttle valve 57 to the computed opening via the servo motor 56.

The control unit 51 also acts as means of correcting the opening of the throttle valve 57 and the ignition period of the igniter 59 when a change-over between the economy cam and power cams is performed so that a large torque step due to the difference of cam characteristics is avoided.

For instance, when a change-over is made from the first cam 21 to the second or third cams 22 or 23, the control unit 51 decreases the opening of the throttle valve 57, while when a change-over is made from the second or third cams 22 or 23 to the first cam 21, the control unit 51 increases the throttle opening.

When a cam change-over is made, the control unit 51 also retards the engine ignition period by a specified time by means of an ignition period signal output to the engine igniter 59.

When changing over between the second cam 22 and third cam 23, there exists an engine speed at which the same torque is produced by both cams when the accelerator is fully open as shown in FIG. 5, so the change-over is made at this speed. Even if the accelerator is not fully open, there is still an engine speed at which the torques generated by both cams are identical for the same throttle openings, so the change-over is made at this latter speed. A torque step is therefore not produced when changing over between the second cam 22 and the third cam 23, and it is unnecessary to correct the throttle opening or ignition period.

Figure 7:
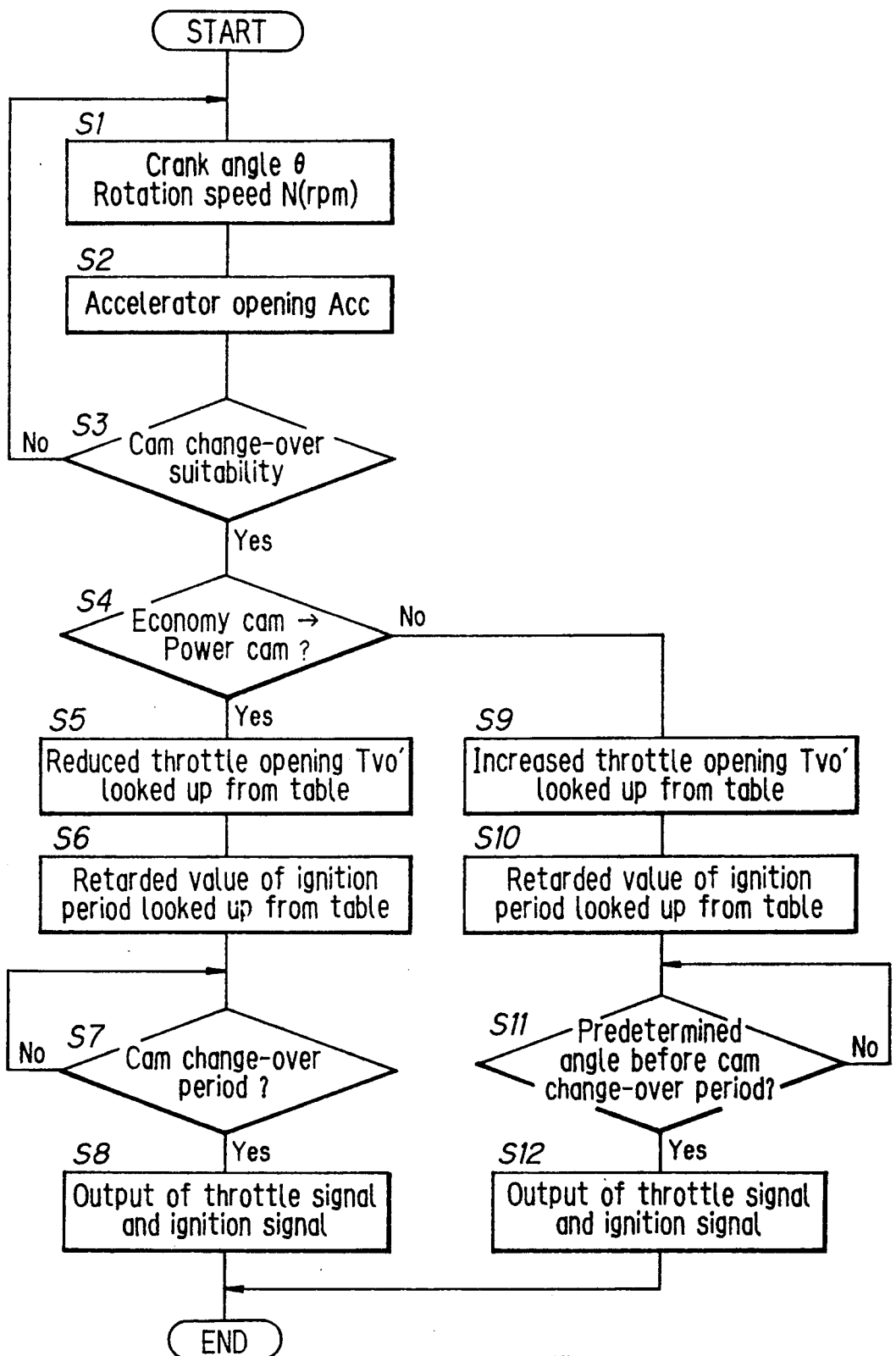
FIG. 7 is a flowchart showing a power correction algorithm used when a cam change-over is made by the power control mechanism according to this invention.
Figure 8A:
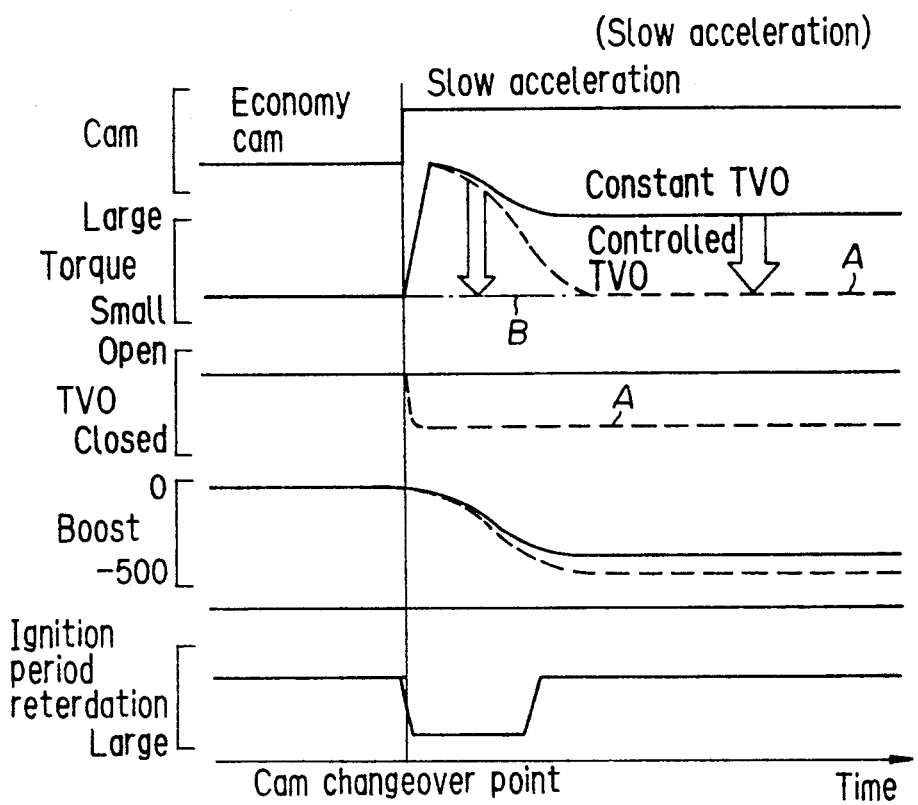
FIGS. 8(a), (b) are graphs for the purpose of describing a relation between a throttle opening, ignition period and torque generated when using an economy cam and power cams in the variable cam engine with the power control mechanism according to this invention.

The correction control of the throttle opening and ignition period carried out by the control unit 51, will now be described by means of the flowchart of FIG. 7 and the timing charts of FIG. 8(a), (b).

First, in a step S1, the control unit 51 reads a crank angle $\theta$ and a rotation speed N from the output of the crank angle sensor 52, and in a step S2, reads the accelerator opening Acc from the output of the accelerator position sensor 53.

In a step S3, it is judged whether according to the control map, the engine running conditions are in a cam change-over region, and if it is judged that they are, it is determined in a step S4 whether or not there should be a change-over from the economy cam to the power cams or vice versa.

Figure 9:
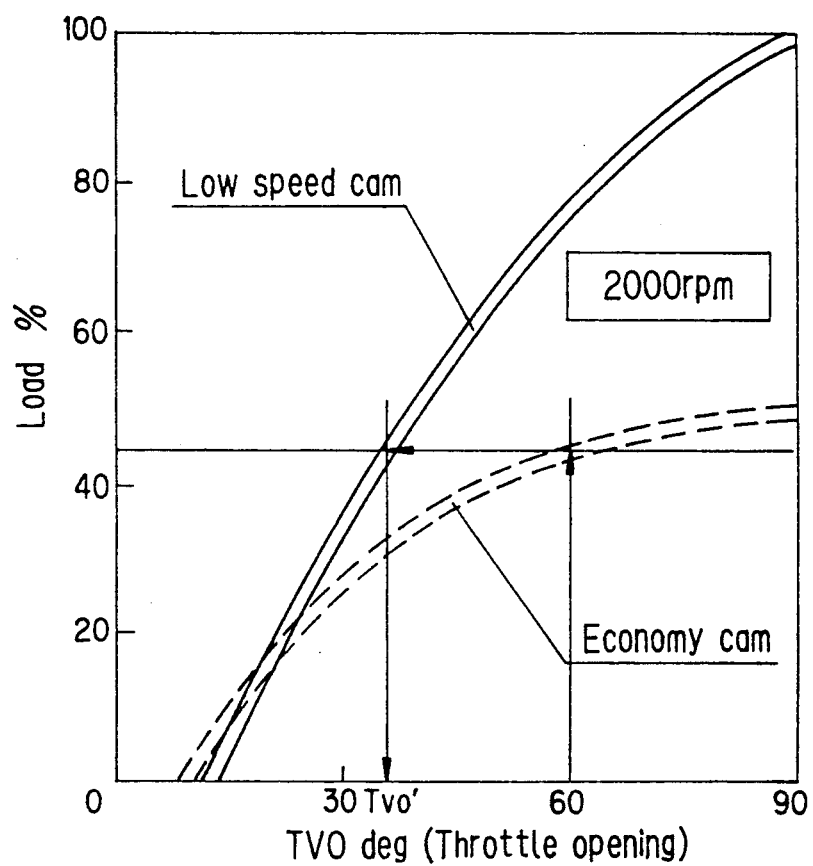
FIG. 9 is a timing chart showing operating characteristics when the cam change-over is made in the variable cam engine with the power control mechanism according to this invention.

When there is a change-over from the economy cam to the power cams, correction is made by decreasing the throttle opening, and as shown in FIG. 9, a corrected throttle opening Tvo', which is such that the load (torque) determined by the engine rotation speed N and the throttle opening Tvo is the same before and after the change-over is made, is read from a table previously drawn up based on the engine rotation speed N and the throttle opening Tvo (S5). In the same way, a retarded value of the ignition period is read in a step S6.

Next, in a step S7, it is determined whether the timing is right to make a cam change-over. This operation consists of determining whether or not a predetermined time has elapsed after a cam change-over signal has been output considering the response time actually required to make the change-over. If it is judged that the timing is right, a throttle signal based on the corrected throttle opening Tvo' which has already been read in the step S5, and an ignition signal based on the retarded value of the ignition period which has already been read in the step S6, are output to the servo drive circuit 55 and the igniter 59 respectively.

As a result, the throttle valve opening is decreased when the cam change-over is made, and the ignition period is retarded by a certain time. In FIG. 8(a), the solid line on the torque graph shows the case when the throttle opening is not corrected. It is seen that in this case, there is a large torque difference before and after the change-over. If on the other hand the throttle opening is corrected as shown by the line A, the torque has the same value after the change-over which is also shown by the line A.

In this case, the torque actually increases temporarily immediately after the change-over is made. This is because air is sucked into the engine due to the characteristics of the power cams immediately after changing over from the economy cam to the power cams when the negative intake pressure remaining downstream of the throttle valve is small, and the intake air accumulating in the engine cylinders therefore temporarily increases. This temporary increase is however corrected by the decrease of power due to retardation of the ignition period.

Even when changing over from the economy cam to the power cams, therefore, the torque generated is maintained constant including the period immediately after the change-over as shown by the line B.

When changing over from the power cams to the economy cam, on the other hand, the throttle opening is increased together with a retardation of the ignition period. In this case, after reading the corrected values in the steps S9 and S10, a throttle signal and ignition signal are output in advance of the cam change-over time by a predetermined crank angle (S11 and S12).

Figure 8B:
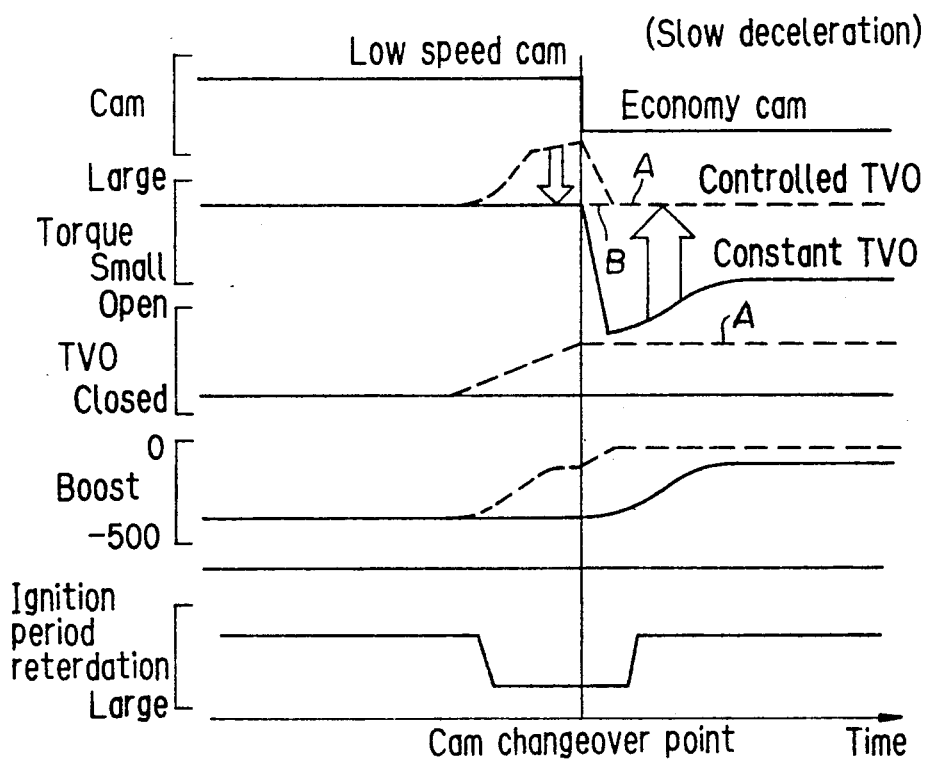

When changing over from the power cams to the economy cam, therefore, as shown by the solid line on the torque graph of FIG. 8(b), the torque decreases when the throttle opening is maintained at the same value, but the decrease of torque is prevented by increasing the throttle opening by a predetermined value as shown by the line A.

Further, as the change-over to the economy cam is made with a large negative intake pressure that existed immediately before the change-over, the amount of air filling the cylinders falls sharply immediately after the change-over, so that if the throttle opening is increased when the change-over is made, the torque temporarily decreases. By opening the throttle before making the change-over, however, this decrease is prevented.

Further, an excessively large torque due to this operation which is also shown by the line A is prevented by retarding the ignition period at the same time as the throttle opening is increased.

Even when changing over from the power cams to the economy cam, therefore, the torque generated is maintained constant including the period immediately after the change-over as shown by the line B in the figure.

In this manner, the change-over from the economy cam to the power cams or vice versa can be made smoothly without producing any torque step.

According to this embodiment, the ignition period was corrected at the same time as the throttle opening was corrected. Provided that the throttle opening is corrected, however, troublesome power variations when the driver operates the accelerator are absorbed, and events which would require special operation of the accelerator before and after a cam change-over can be definitively avoided.

The foregoing description of a preferred embodiment for the purpose of illustrating this invention is not to be considered as limiting or restricting the invention, since many modifications may be made by the exercise of skill in the art without departing from the scope of the invention.

The embodiments of the invention in which an exclusive property or privilege is claimed are defined as follows:

1. A variable cam engine with a valve driven by cams which rotate in synchronism with the engine revolution, comprising:
   a power cam whose shape is designed to give large torque output to the engine,
   an economy cam whose shape is designed to give good fuel cost performance,
   setting means to set a change-over region of said cams according to engine running conditions,
   a cam change-over mechanism which changes over from one to another of said cams at the set change-over region and transmits the motion of the cam selected by the change-over to said valve,
   a throttle valve whose opening can be controlled independently of the accelerator pedal,
   control means to open and close said throttle valve such that the output torque of the engine depends on the position of said accelerator pedal, and
   throttle opening correcting means to correct said throttle opening such that the torque generated before and after making a cam change-over is the same.

2. A variable cam engine as defined in claim 1, wherein said throttle opening correcting means applies a correction to decrease said throttle valve opening when a change-over is made from said economy cam to said power cam.

3. A variable cam engine as defined in claim 1, wherein said throttle opening correcting means applies a correction to increase said throttle valve opening before making a change-over from said power cam to said economy cam.

4. A variable cam engine with a valve driven by cams which rotate in synchronism with the engine revolution, comprising:
   a power cam whose shape is designed to give large torque output to the engine,
   an economy cam whose shape is designed to give good fuel cost performance,
   setting means to set a change-over region of said cams according to engine running conditions,
   a cam change-over mechanism which changes over from one to another of said cams at the set change-over region and transmits the motion of the cam selected by the change-over to said valve,
   a throttle valve whose opening can be controlled independently of the accelerator pedal,
   control means to open and close said throttle valve such that the output torque of the engine depends on the position of said accelerator pedal,
   throttle opening correcting means to correct said throttle opening such that the torque generated before and after making a cam change-over is the same, and
   ignition period retarding means to temporarily retard an engine ignition period when said cam change-over is made.

5. A variable cam engine as defined in claim 4, wherein said ignition period retarding means retards ignition at the same time as said throttle opening correcting means corrects said throttle opening.

* * * * *